United States Patent
Wallin et al.

(10) Patent No.: US 7,165,146 B2
(45) Date of Patent: Jan. 16, 2007

(54) MULTIPROCESSING COMPUTER SYSTEM EMPLOYING CAPACITY PREFETCHING

(75) Inventors: Dan Wallin, Uppsala (SE); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 368 days.

(21) Appl. No.: 10/408,691

(22) Filed: Apr. 7, 2003

(65) Prior Publication Data

US 2004/0148471 A1    Jul. 29, 2004

Related U.S. Application Data

(60) Provisional application No. 60/443,045, filed on Jan. 28, 2003.

(51) Int. Cl.
*G06F 13/00* (2006.01)
(52) U.S. Cl. .................................................. 711/137
(58) Field of Classification Search .................. None
See application file for complete search history.

(56) References Cited

U.S. PATENT DOCUMENTS

| | | | | |
|---|---|---|---|---|
| 6,119,205 A | * | 9/2000 | Wicki et al. ............... 711/143 |
| 6,128,703 A | * | 10/2000 | Bourekas et al. ........... 711/138 |
| 6,594,730 B1 | * | 7/2003 | Hum et al. .................. 711/137 |
| 6,665,776 B1 | * | 12/2003 | Jouppi et al. ............... 711/137 |
| 6,957,306 B1 | * | 10/2005 | So et al. ...................... 711/137 |
| 2002/0087802 A1 | * | 7/2002 | Al-Dajani et al. .......... 711/137 |

* cited by examiner

*Primary Examiner*—Mano Padmanabhan
*Assistant Examiner*—Craig E. Walter
(74) *Attorney, Agent, or Firm*—Meyertons Hood Kivlin Kowert & Goetzel, P.C.; B. Noël Kivlin; Rory D. Rankin

(57) ABSTRACT

Various embodiments of a multiprocessing computer system employing capacity prefetching are disclosed. In one embodiment, a cache subsystem implements a method for prefetching data. The method includes the cache subsystem receiving a request for data, and determining a cause of a cache miss that occurs in response to the request. The cache subsystem includes a controller that selectively prefetches additional data depending upon the cause of the cache miss. In one embodiment, determining the cause of the cache miss includes determining whether a cache line corresponding to the request exists in the cache memory of the cache subsystem in an invalid state. Additional data is prefetched in response to determining that the cache line is not present in the cache memory in an invalid state.

19 Claims, 5 Drawing Sheets

MULTIPROCESSING COMPUTER SYSTEM EMPLOYING CAPACITY PREFETCHING

This application claims the benefit U.S. provisional patent application Ser. No. 60/443,045, entitled "Multiprocessing Computer System Employing Capacity Prefetching", filed Jan. 28, 2003.

BACKGROUND OF THE INVENTION

1. Field of the Invention

This invention relates to the field of multiprocessor computer systems and, more particularly, to mechanisms and methods for prefetching data in multiprocessor computer systems.

2. Description of the Related Art

Cache-based computer architectures are typically associated with various features to support efficient utilization of the cache memory. A cache memory is a high-speed memory unit interposed in a memory hierarchy between a slower system memory and the microprocessor to improve effective memory transfer rates and, accordingly, improve system performance. The name refers to the fact that the small memory unit is essentially hidden and appears transparent to the user, who is aware only of a larger system memory.

An important consideration in the design of a cache memory subsystem is the choice of key design parameters, such as cache line size, degree of subblocking, cache associativity, prefetch strategy, etc. The problem in finding an "optimum setting" for these design parameters is that while improving one property, some others may be degraded. For example, an excessively small cache line may result in a relatively high number of capacity misses and in relatively high address traffic. A slightly longer cache line often decreases the cache miss rate and address traffic, while the data bandwidth increases. Enlarging the cache lines even more can result in increased data traffic as well as increased address traffic, since misses caused by false sharing may start to dominate. A further complication is that application behavior can differ greatly. A setting which works well for one application may work poorly for another.

It is also well known that large cache lines are often beneficial for data that cause capacity misses due to spatial locality. Data that are involved in communication sometimes take advantage of large cache lines (true sharing). However, the risk of false sharing misses increases with large cache lines.

Prefetching in multiprocessors has been studied by several researchers as a method of reducing the miss penalty. Numerous prefetching schemes have been proposed, both software-based and hardware-based.

The hardware approaches to prefetching in multiprocessors usually employ either stride prefetching or sequential prefetching. While sequential prefetching prefetches the immediately following addresses on a cache miss, stride prefetching prefetches addresses that are a certain distance away from the previous cache miss. Stride prefetching has a certain learning time under which the prefetcher computes which address to prefetch next. The efficiency of sequential and stride prefetching depends on the access pattern behavior.

In both systems that employ sequential prefetching and systems that employ stride prefetching, the address and data traffic may increase since for each prefetch a new message is sent on the network. In some instances the prefetch may be performed unnecessarily. Bus-based multiprocessors are especially sensitive to a heavy increase in address traffic since the available snoop bandwidth is limited. Thus, although various prefetch strategies have been successful in reducing the miss penalty in multiprocessing systems, it would be desirable to increase the efficiency of prefetching even further by improving prefetch accuracy. It would be particularly desirable to avoid cache misses introduced by communicating cache lines and associated false sharing.

SUMMARY OF THE INVENTION

Various embodiments of a multiprocessing computer system employing capacity prefetching are disclosed. In one embodiment, a cache subsystem implements a method for prefetching data. The method includes the cache subsystem receiving a request for data, and determining a cause of a cache miss that occurs in response to the request. The cache subsystem includes a controller that selectively prefetches additional data depending upon the cause of the cache miss. In one embodiment, determining the cause of the cache miss includes determining whether a cache line corresponding to the request exists in the cache memory of the cache subsystem in an invalid state. Additional data is prefetched in response to determining that the cache line is not present in the cache memory in an invalid state.

Figure 1:
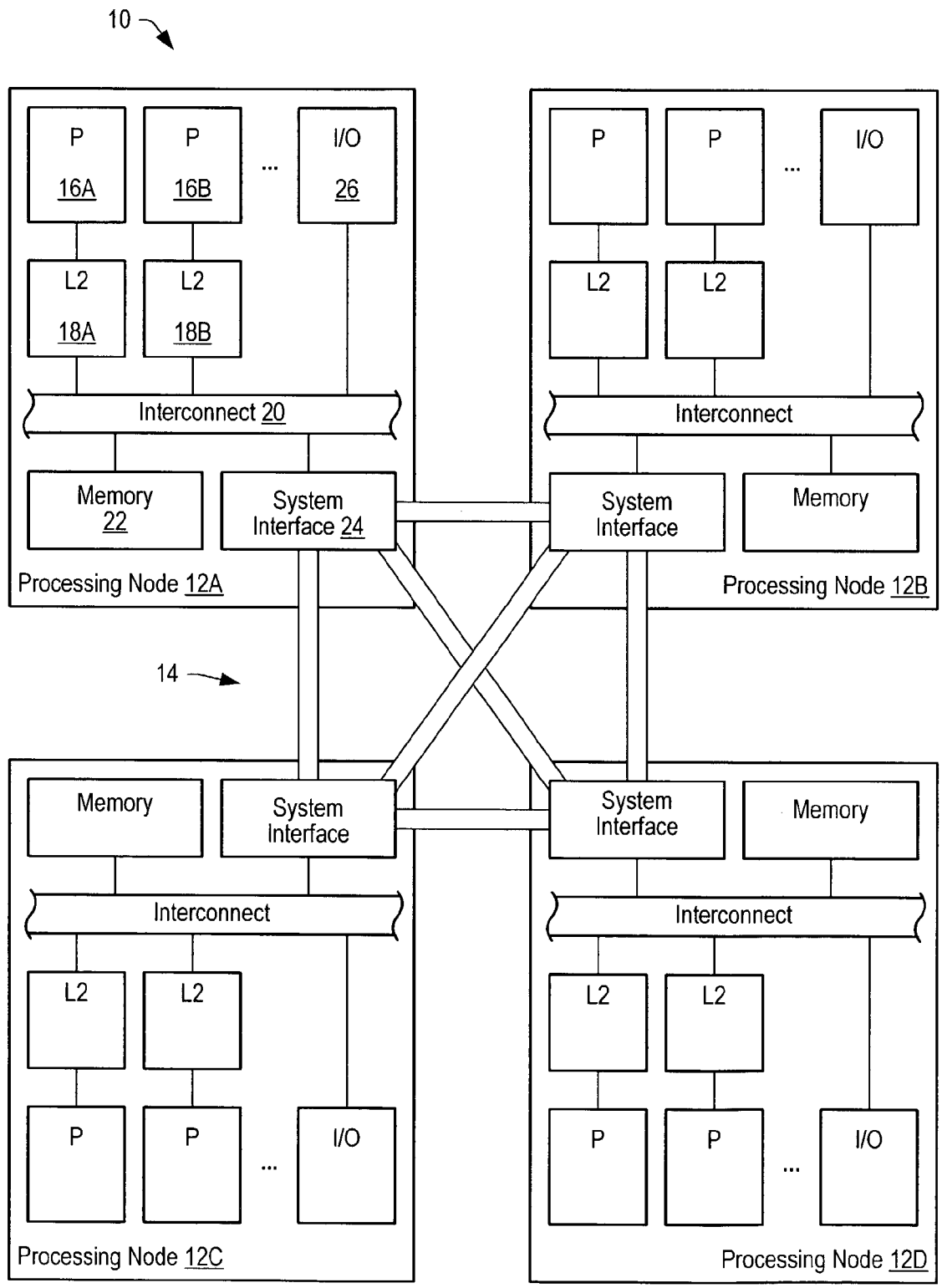
FIG. 1 is a block diagram of a multiprocessing computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a multiprocessing computer system 10 is shown. Computer system 10 includes multiple processing nodes 12A–12D interconnected by a point-to-point network 14. Elements referred to herein with a particular reference number followed by a letter will be collectively referred to by the reference number alone. For example, processing nodes 12A–12D will be collectively referred to as processing nodes 12. In the embodiment shown, each processing node 12 includes multiple processors, caches, a memory, and a system interface. For example, processing node 12A is configured with multiple processors including processors 16A–16B. The processors 16 are connected to caches 18, which are further coupled to a node interconnect 20. Additionally, a memory 22 and a system interface 24 are coupled to node interconnect 20. Still further, one or more input/ output (I/O) interfaces 26 may be coupled to node interconnect 20. I/O interfaces 26 are used to interface to peripheral devices such as serial and parallel ports, disk drives, modems, printers, etc. Other processing nodes 12B–12D may be configured similarly.

Each processing node 12 is a processing node having memory 22 as the shared memory. Processors 16 are high performance processors. In one embodiment, each processor 16 may employ an ultraSPARC™ processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. Caches 18 may be configured in any of a variety of specific cache arrangements. For example, set associative or direct-mapped configurations may be employed. In some embodiments, the processors 16 and caches 18 of a node may be incorporated together on a single integrated circuit in a chip multiprocessor (CMP) configuration. In other embodiments, a given processing node may include a single processor rather than multiple processors.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between processing nodes 12 as well as among processors 16 and caches 18 within a particular processing node 12A–12D. In one embodiment, the system interface 24 of each node may include a coherence controller to provide internode coherency.

In various embodiments, portions of memory 22 may be allocated to cache data that is mapped to other nodes (i.e., data having remote home nodes). In this manner, data accessed by a processor 16 may be cached in an allocated location of the memory 22 of that node to allow quicker subsequent accesses to the data.

In addition to maintaining internode coherency, system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

Figure 2:
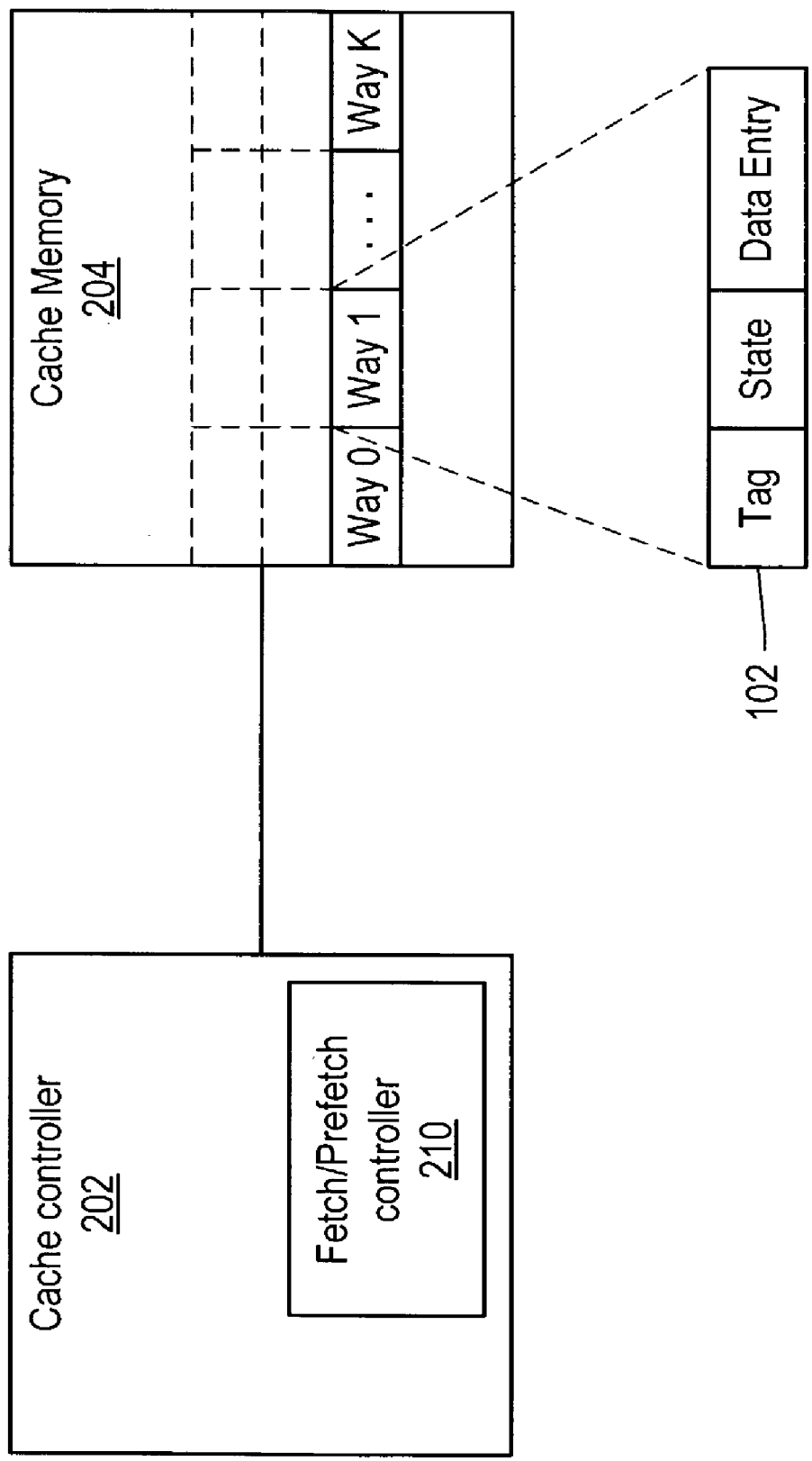
FIG. 2 is a block diagram illustrating one embodiment of a cache memory subsystem.

FIG. 2 is a block diagram of a cache subsystem illustrative of each of the caches 18 of FIG. 1. It is noted that in other embodiments, the mechanisms as described below may be employed in other cache levels, such as an L3 cache subsystem. As illustrated, the cache subsystem includes a cache controller 202 coupled to a cache memory 204. As will be described in further detail below, cache controller 202 includes a fetch/prefetch controller 210 configured to perform prefetching operations.

In the depicted embodiment, cache memory 204 is implemented as a K-way set associative cache structure. A line of storage 102 within cache memory 204 is shown with a data entry, a tag field, and a state field. The state field identifies the state of the cache line, such as Modified, Owned, Shared, or Invalid in the MOSI protocol. In a conventional manner, a given set of lines of the cache memory 204 is accessed using an index portion of the address of a desired line. An occurrence of a cache hit is determined by cache controller 202 by comparing a tag portion of the address with tag information stored in the tag field of the cache line, and by determining whether the state of the cache line is sufficient to satisfy the particular request (i.e., whether a sufficient access right to the line exists). It is noted that in other embodiments, cache memory 204 may be implemented using other specific cache arrangements, as desired. Similarly, other cache coherence protocols, such as the MOESI invalidate protocol may alternatively be employed.

Figure 3:
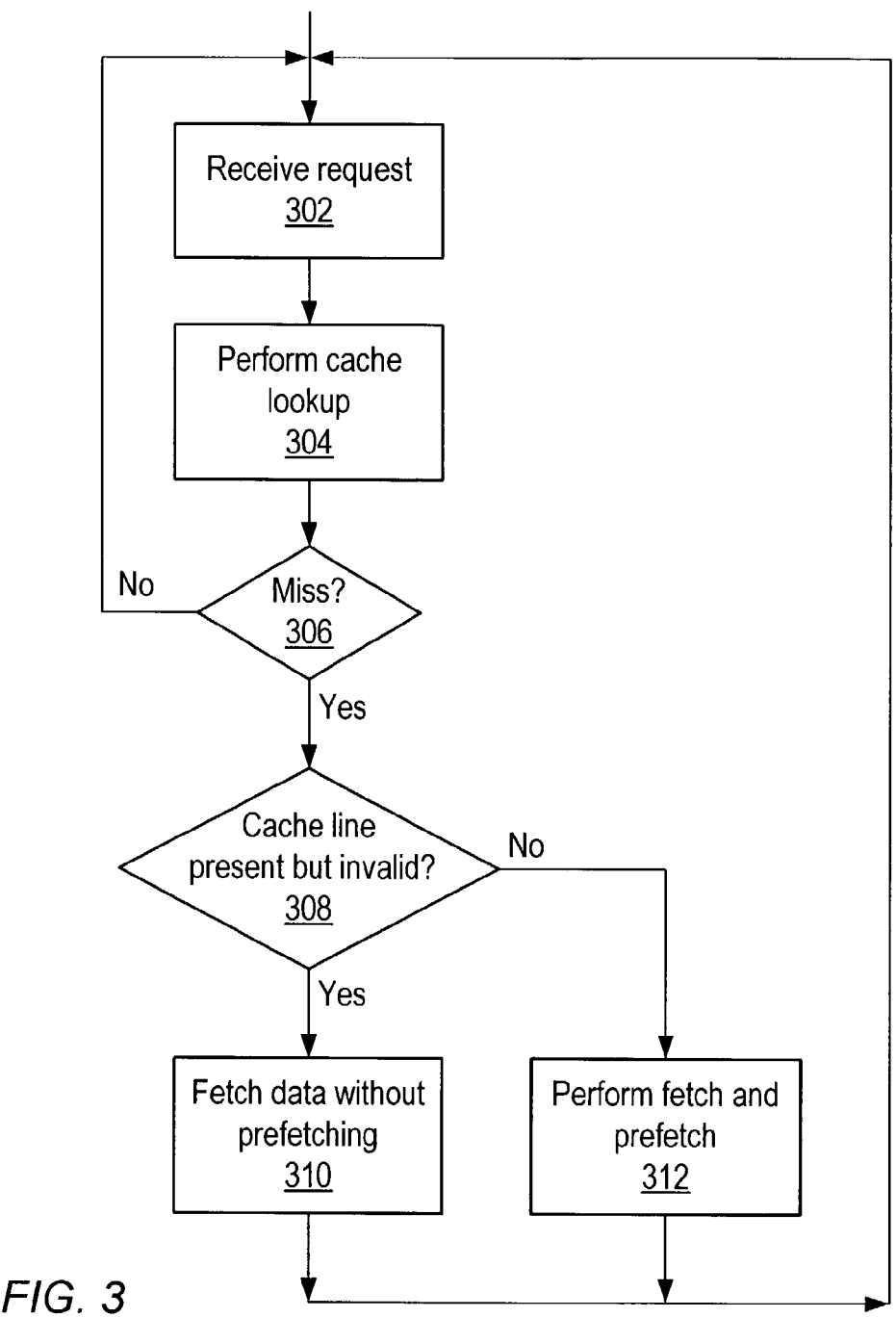
FIG. 3 is a flow diagram illustrating aspects of operation of one embodiment of a fetch/prefetch controller.

FIG. 3 is a flow diagram illustrating aspects of operation of one embodiment of fetch/prefetch controller 210. In step 302, cache controller 202 receives a request for a particular cache line. The request may correspond to a read operation or a write operation initiated by the corresponding processor 16. In response to receiving the request, cache controller 202 performs a lookup within cache memory 204 in step 304 to determine whether a cache line corresponding to the address of the request resides in the cache memory, and to determine whether the access right to the line as indicated by the state field is sufficient to satisfy the request. A cache hit occurs when a line exists within cache memory 204 that can be used to satisfy the request. If a hit occurs (step 306), cache controller 202 may perform subsequent operations (not shown) to satisfy the request, such as providing the data to the requesting processor in the case of a read operation or writing a new data entry to the cache line in the case of a write operation.

A miss may occur in cache memory 204 for various reasons. For example, a request to cache controller 202 that corresponds to a write operation initiated by the associated processor 16 may require that a line be in a valid, writable state, such as the modified state of the MOSI protocol. If a writable copy of the cache line does not exist in cache memory 204, the fetch/prefetch controller 210 may initiate a ReadExclusive request on interconnect 20 to obtain a writable copy of the cache line. Alternatively, if the cache line exists in the cache memory 204 but is not in a writable state (e.g., a copy exists in the shared state of the MOSI protocol), fetch/prefetch controller 210 may transmit an Upgrade request on interconnect 20 to allow the line to be upgraded to a writable state. Still further, if a request to cache controller 202 is received that corresponds to a read operation initiated by the associated processor 16, but a copy of the cache line does not already exist in the cache memory 204 or the cache line exists but is in an invalid state, cache controller 202 may transmit a Read request on interconnect 20 to obtain a readable copy of the cache line. It is noted that the requests initiated on interconnect 20 may be responded to by a memory 22 or by another cache 18 that owns the cache line.

As stated previously, fetch/prefetch controller 210 performs prefetch operations in response to certain requests received by cache controller 202. More particularly, in one embodiment, when a cache miss occurs in step 306, subsequent processing by fetch/prefetch controller 210 is dependent upon whether the cache line associated with the miss is present in the cache memory 204 but is in an invalid state. If the cache line is present in cache memory 204 but is in an invalid state (step 308), fetch/prefetch controller 210 initiates a request on interconnect 20 to fetch the line from memory 22 or another cache 18 without prefetching (step 310). The request initiated by fetch/prefetch controller 210 may be in the form of, for example, a ReadExclusive request if a writable copy of the line is needed, or in the form of a Read request if only a read access right to the line is needed. It is noted that a miss that occurs with respect to a cache line that is present in cache memory 204 but that is invalid can be correlated with communicating cache lines.

On the other hand, if the cache line associated with the miss is not present in the cache memory 204, fetch/prefetch controller 210 may perform the corresponding cache line fetch and one or more prefetch operations in step 312 to fetch additional lines in response to the request. The fetch/prefetch controller 210 may further be configured to perform one or more prefetch operations in the form of upgrade requests if a write access right to a line existing in the cache is needed to service the request, but the line only exists in cache memory 204 in a readable state (e.g., the Shared state of the MOSI protocol).

Thus, in one embodiment when a request corresponding to a read operation is received and the cache line is not present in the cache memory 204, fetch/prefetch controller 210 generates a Read Request on bus interconnect 20 corresponding to the cache line and additionally transmits another Read Request to the next sequential cache line. Similarly, in response to a request corresponding to a write operation, if a copy of the cache line does not exist in the cache memory, fetch/prefetch controller 210 generates a ReadExclusive request on interconnect 20 to fetch the corresponding line and additionally transmits another ReadExclusive request to the next sequential cache line. If a request is received that requires a write access right to a cache line that exists in the cache memory in a read only state (e.g., the shared state), fetch/prefetch controller 210 may additionally be configured to generate an Upgrade Request to the corresponding cache line as well as an Upgrade Request to the next sequential cache line. It is noted that fetch/prefetch controller 210 may transmit this additional Upgrade Request if that cache line also exists in the cache memory 204 in a readable state. If the next sequential cache line is not present in the cache memory 204 in a readable state, fetch/prefetch controller 210 may alternatively initiate a ReadExclusive prefetch request to transfer the next sequential cache line into cache memory 204 in a writable state.

The capacity prefetching technique as described above and illustrated in FIG. 3 may separate non-communicating lines, which cause capacity misses, from communicating lines that could be involved in false sharing. In the event the cache line is present in the cache memory 204 but is invalid, the line is fetched without prefetching. In this manner, the actual cache line size will effectively appear shorter for communicating cache lines and longer for non-communicating lines.

In another embodiment, upon determining that prefetching is to be performed in step 312, fetch/prefetch controller 210 may prefetch a plurality of sequential cache lines. Fetch/prefetch controller 210 may likewise be configured to perform update requests for more than one sequential line. In other embodiments, fetch/prefetch controller 210 may additionally or alternatively implement stride-based prefetching, wherein prefetch operations performed in step 312 are based on a stride pattern rather than on a sequential pattern.

Figure 4:
FIG. 4 illustrates an exemplary format of a bundled transaction request.

Bundling techniques may also be employed by fetch/prefetch controller 210 wherein an original Read, ReadExclusive or Upgrade request may be bundled together with the associated prefetch request(s) to form a single request transaction that is conveyed on interconnect 20. In this manner, the amount of address traffic on interconnect 20 (and network 14) may be reduced. In one implementation as illustrated in FIG. 4, a bundled transaction request conveyed on interconnect 20 by fetch/prefetch controller 210 may include a simple bit-map indicating which lines beyond the original request to prefetch into the cache memory 204 (or indicating the lines beyond the original request that are being upgraded). In the illustration, the request includes a request type field identifying the request type, such as, for example, a Read request, a ReadExclusive request, or an Upgrade request, and an address field indicating the address of the original request. A prefetch bitmap field may be used to indicated the lines beyond the original request to prefetch. Embodiments are also possible in which data is prefetched in a bundled transaction based on a certain stride.

While bundling the original Read, ReadExclusive and Upgrade requests together with the prefetch requests may reduce the number of address transactions conveyed on interconnect 20, the technique may not reduce the number of snoop lookups each cache 18 is required to perform. In addition, in some instances, the technique may create a multi-source situation, where a single address transaction would result in data packets being transferred from many different sources. In various systems, such a situation may violate some basic assumptions for cache coherence.

Figure 5:
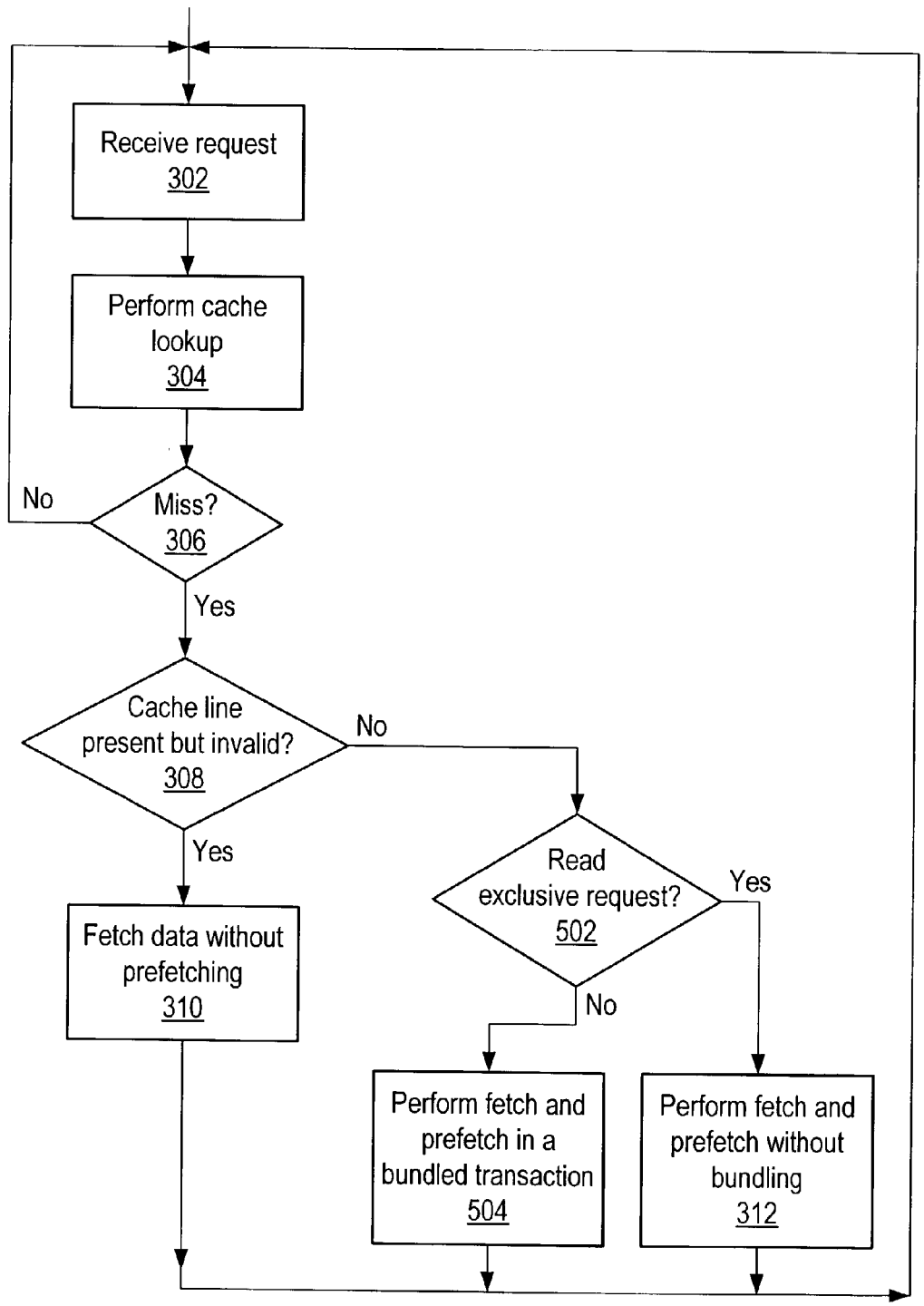
FIG. 5 is a flow diagram illustrating aspects of operation of another embodiment of a fetch/prefetch controller.

Accordingly, in a further embodiment as illustrated in FIG. 5, a more restrictive approach to the bundling technique may be employed by fetch/prefetch controller 210. Steps corresponding to those of FIG. 3 are numbered identically. In the embodiment of FIG. 5, ReadExclusive requests are not bundled. Since these transactions may cause changes to any of the snooping caches, they would still require a snoop lookup in each cache for each bundled cache line. Thus, as illustrated, if a request resulting in a miss in cache memory 204 necessitates issuance of a ReadExclusive request (step 502) on interconnect 20 (step 502), fetch/prefetch controller 210 transmits the ReadExclusive request on interconnect 20 corresponding to the original request and transmits a separate prefetch request transaction without bundling. On the other hand, if the request resulting in a cache miss does not necessitate issuance of a ReadExclusive request, fetch/prefetch controller 210 may alternatively bundle the original request with one or more prefetch requests into a single request transaction on interconnect 20 in step 504. It is noted that in a system that implements such a bundling technique, the memory 22 and other caches 18 may be configured such that only the owner of the cache line corresponding to the original request will supply data on a prefetch request. In addition, the owner will only reply with data for the prefetch if it is also the owner of the requested prefetch line. In this manner, only the owner may have to snoop the bundled cache lines and can reply to a request.

Figure 6:
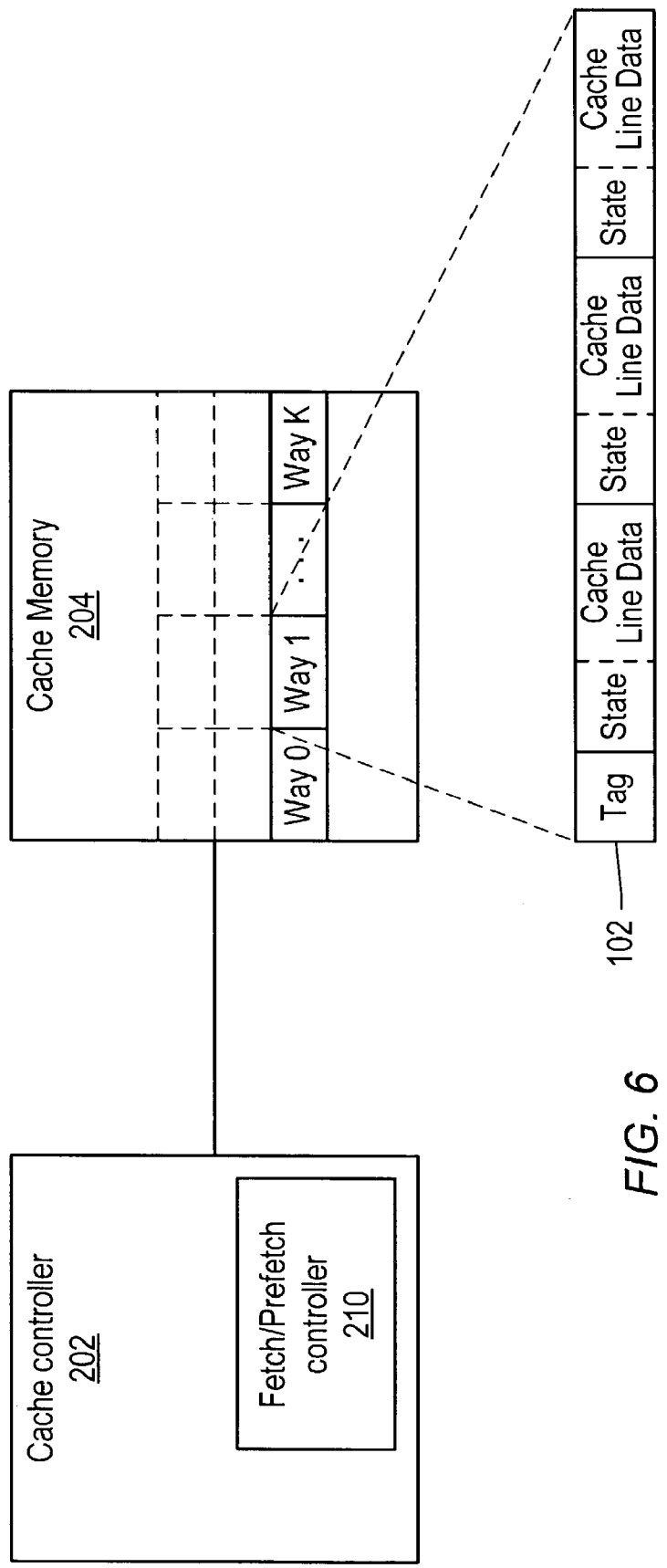
FIG. 6 is a block diagram of a cache memory subsystem employing a subblocked cache structure.

To reduce memory overhead in the cache implementation, a subblocked cache may be employed. As illustrated in FIG. 6, in a subblocked cache, a single address tag is associated with several cache lines, while each cache line has its own state field. In the embodiment of FIG. 6, fetch/prefetch controller 210 may be configured to prefetch lines in step 312 (and/or step 504) that are aligned to addresses having the same cache tag. Thus, on a non-communication miss, fetch/prefetch controller 210 conveys a request on interconnect 20 to request all available lines within the same cache tag.

It is noted that in other embodiments, additional or alternative request types may be conveyed by fetch/prefetch controller 210 on interconnect 20, depending upon the implementation. In addition, single-node embodiments of a multiprocessing computer system are further possible that employ a fetch/prefetch controller 210 in accordance with the foregoing description.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for prefetching data in a multiprocessing computer system comprising:
   a cache subsystem receiving a request to access a line of data;
   detecting a cache miss in response to said request;
   in response to said cache miss:
      determining a cause of said cache miss;
      fetching said line of data;
      prefetching additional data, wherein said additional data is prefetched unless it is determined that said cache miss corresponds to a cache line that is both present in the cache, and in an invalid state.

2. The method as recited in claim 1 wherein the additional data is an additional line of data.

3. The method as recited in claim 2 wherein the additional line of data is a sequential line of data.

4. The method as recited in claim 1 wherein the additional data includes a plurality of sequential lines of data.

5. The method as recited in claim 1 further comprising the cache subsystem conveying an address transaction to request the data.

6. The method as recited in claim 5 further comprising the cache subsystem bundling prefetch requests wit the transaction.

7. The method as recited in claim 1 wherein the cache subsystem is a subblocked cache subsystem.

8. The method as recited in claim 7 wherein the selectively prefetching of additional data includes selectively prefetching additional data within die same cache block depending upon the cause of the cache miss.

9. The method as recited in claim 8 wherein determining the cause of the cache miss includes determining whether a cache line corresponding to the request exists in a cache memory of the cache subsystem in an invalid state.

10. A cache subsystem comprising:
    a cache memory; and
    a cache controller for receiving a request to access a line of data, wherein said cache controller includes a fetch/prefetch controller configured to:
    detecting a cache miss in response to said request;
    in response to said cache miss:
       determining a cause of said cache miss fetching said line of data;
       prefetching additional data, wherein said additional data is prefetched unless it is determined that said cache miss corresponds to a cache line that is both present in the cache, and in an invalid state.

11. The cache subsystem as recited in claim 10 wherein the additional data is an additional line of data.

12. The cache subsystem as recited in claim 11 wherein the additional line of data is a sequential line of data.

13. The cache subsystem as recited in claim 10 wherein the additional data includes a plurality of sequential lines of data.

14. The cache subsystem as recited in claim 10 wherein said fetch/prefetch controller is further configured to convey an address transaction to request the data.

15. The cache subsystem as recited in claim 14 wherein said fetch/prefetch controller is configured to bundle prefetch requests with the transaction.

16. The cache subsystem as recited in claim 10 wherein the cache memory is a subblocked cache memory.

17. The cache subsystem as recited in claim 16 wherein said fetch/prefetch controller is configured to the selectively prefetch additional data within the same cache block depending upon the cause of the cache miss.

18. The cache subsystem as recited in claim 17 wherein said fetch/prefetch controller is configured to selectively prefetch the additional data depending upon whether a cache line corresponding to the request exists in the cache memory in an invalid state.

19. The cache subsystem as recited in claim 18 wherein said fetch/prefetch controller is configured to prefetch the additional data in response to determining tat the cache line is not present in the cache memory in an invalid state.

* * * * *